(12) United States Patent
Fukutani

(10) Patent No.: US 7,624,580 B2
(45) Date of Patent: Dec. 1, 2009

(54) DEVICE FOR SUPPLYING SECONDARY AIR IN A GAS TURBINE ENGINE

(75) Inventor: Masayuki Fukutani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 856 days.

(21) Appl. No.: 11/265,135

(22) Filed: Nov. 3, 2005

(65) Prior Publication Data

US 2006/0213202 A1   Sep. 28, 2006

(30) Foreign Application Priority Data

Feb. 8, 2005   (JP)   ............................... 2005-032103

(51) Int. Cl.
    F02C 6/04   (2006.01)
(52) U.S. Cl. ....................... 60/785; 60/39.08
(58) Field of Classification Search ............... 60/782, 60/785, 39.08, 806
    See application file for complete search history.

(56) References Cited

U.S. PATENT DOCUMENTS

| 5,611,661 | A * | 3/1997 | Jenkinson | .................... 415/112 |
| 6,513,335 | B2 * | 2/2003 | Fukutani | ...................... 60/785 |
| 6,966,191 | B2 * | 11/2005 | Fukutani et al. | ................ 60/785 |
| 7,363,762 | B2 * | 4/2008 | Montgomery et al. | .......... 60/685 |

* cited by examiner

*Primary Examiner*—William H Rodriguez
(74) *Attorney, Agent, or Firm*—Squire, Sanders & Dempsey L.L.P.

(57) ABSTRACT

In a device for supplying secondary air in a gas turbine engine provided with an inner shaft (8) and a hollow outer shaft (7) coaxially nested with each other, a seal air introduction passage (71, 85, 88) is defined inside the engine for introducing a part of high pressure air drawn from a high pressure compressor into a seal section provided in each of the bearing boxes for supporting the inner and outer shafts; and a swirl air cooling turbine (59) is provided in the seal air introduction passage and attached to a part attached to the outer shaft in a rotationally fast manner. The swirl air cooling turbine (59) is formed around a section of the outer shaft intermediate between the high pressure compressor and the high pressure turbine, the swirl air cooling turbine including a spiral flow path extending in a substantially cylindrical plane coaxial with the outer shaft. Because the high pressure swirl air is cooled by the swirl air cooling turbine provided in a radially central part, the energy of the swirl air is effectively expended, and this prevents the generation of a stagnation zone. Thereby, the secondary air can be favorably cooled before it is forwarded to the user such as the bearing boxes without causing an undue rise in the pressure of the impeller back chamber.

10 Claims, 5 Drawing Sheets

DEVICE FOR SUPPLYING SECONDARY AIR IN A GAS TURBINE ENGINE

TECHNICAL FIELD

The present invention relates to a device for supplying secondary air in a gas turbine engine.

BACKGROUND OF THE INVENTION

In a certain conventional gas turbine engine, an inner shaft supporting a low pressure compressor impeller wheel and a low pressure turbine wheel and an outer shaft supporting a high pressure compressor impeller wheel and a high pressure turbine wheel typically consist of hollow shafts which are coaxially nested with each other. Such a gas turbine engine is disclosed in WO98/28521 A1. According to the conventional gas turbine engine disclosed in this international patent publication, the outer and inner shafts are supported by separate bearings at their front and rear ends, and each bearing is lubricated by a forced lubrication system which blows lubricating oil fed by a pump to the bearing.

In such a forced lubricating system, to positively prevent the lubricating oil from leaking out of the bearing boxes provided in the front and rear ends of the outer and inner shafts, high pressure air drawn from the compressor and whose pressure and flow rate are controlled by using an orifice or the like is conducted to the exterior of the oil seals of the bearing boxes as seal air to keep the interior of the bearing boxes at a lower pressure than the exterior thereof. Also, a part of the high pressure air is used for cooling the turbine rotor.

The air (secondary air) for cooling and sealing can be supplied by bleeding an intermediate stage or final stage of the compressor (CDP) depending on the user of the secondary air and required pressure. Alternatively, the bleed air for sucking a boundary layer may be used for this purpose. In case of a centrifugal compressor, air may be bled by directing the flow issuing from the outlet of an impeller into a gap between the back side of the impeller and casing.

However, the gas turbine engines that supply air for cooling and sealing as described above have the following problems. (1) Because the high-pressure, high-temperature gas (secondary air) produced by the compressor is used for purposes other than providing a thrust, the overall efficiency of the engine is reduced. (2) When the high-temperature, high-pressure seal air is introduced into the bearing box, it causes the temperature of the lubricating oil to rise. This prevents adequate cooling of the lubricating oil, undesirably heats such components as the casing typically made of aluminum alloy and gears typically made of steel, and causes premature degradation of the lubricating oil.

To avoid such problems of the prior art, it was proposed in copending U.S. patent application Ser. No. 10/844,604 (publication No. US2005-0132706A1) to provide an impeller back chamber behind the centrifugal compressor and a high pressure air cooling turbine driven by the outer shaft in the impeller back chamber so that the flow of the high pressure swirl air conducted from the back side of the impeller into the impeller back chamber may be cooled by the high pressure air cooling turbine. According to this previous proposal, the high pressure swirl air that has flowed into the impeller back chamber flows into the turbine from the outer periphery thereof so that the energy is transferred from the high pressure air flow to the high pressure air cooling turbine, and the temperature of the high pressure air is lowered before it is supplied to the bearing boxes and turbine rotor as secondary air (for sealing and cooling purposes). Therefore, the energy loss of the engine is minimized, and the temperature of the lubricating oil in the bearing boxes can be controlled below a prescribed lever.

However, according to this previous proposal, the region radially inside the inlet (outer periphery) region of the high pressure air cooling turbine in the impeller back chamber forms a stagnation zone where there is little exchange of air with the outside. As the high pressure swirl air flows from the outer periphery (inlet end) of the impeller back chamber to the radially inner region, the swirl component progressively increases in proportion to the inward flow rate and is inversely proportional to the radius. However, the stagnation zone acts against the increase in the swirl component, and the friction of the air flow tends to obstruct the swirling of the high pressure swirl air even in the region outside the stagnation zone. This in turn prevents an adequate drop in the pressure of the high pressure swirl air, and causes an undesirable rise in the average pressure of the impeller back chamber.

If the average pressure of the impeller back chamber rises, because the front wall of the impeller back chamber is defined by the impeller wheel of the high pressure compressor, an axially forward load acts upon the impeller wheel (in other words, the outer shaft). As a result, the thrust acting upon the bearings supporting the outer shaft increases so that the resulting rise in the temperature of these bearings could lead to the premature degradation of the lubricating oil and adversely affects the durability of the bearings.

BRIEF SUMMARY OF THE INVENTION

In view of such problems of the prior art, a primary object of the present invention is to provide a device for supplying secondary air in a gas turbine engine that can favorably lower the temperature of the secondary air before it is forwarded to the user such as the bearing boxes.

A second object of the present invention is to provide a device for supplying secondary air in a gas turbine engine that can effectively cool the secondary air without increasing the axial thrust acting on the bearings supporting the outer shaft.

A third object of the present invention is to provide a device for supplying secondary air in a gas turbine engine that can effectively avoid an undesirable rise in the pressure in the impeller back chamber.

The present invention can achieve at least one of the foregoing objects by providing a device for supplying secondary air in a gas turbine engine, comprising: a device for supplying secondary air in a gas turbine engine, comprising: an inner shaft (8) connected to a low pressure compressor (LC) and a low pressure turbine (LT); an outer shaft (7), coaxially disposed with respect to the inner shaft, connected to a high pressure compressor (HC) and a high pressure turbine (HT); at least a pair of bearing boxes (21, 25) which are spaced from each other in an axial direction each accommodating a bearing (5f, 5r, 6f, 6r) for supporting an end of the inner or outer shaft; a seal air introduction passage (71, 85, 88) for introducing a part of high pressure air drawn from the high pressure compressor into a seal section provided in each of the bearing boxes; and a high pressure air introduction turbine (57, 59) provided in the seal air introduction passage and attached to a part attached to the outer shaft in a rotationally fast manner, the high pressure air introduction turbine including a swirl air cooling turbine (59) formed around a section of the outer shaft intermediate between the high pressure compressor and the high pressure turbine, and including a spiral flow path extending in a substantially cylindrical plane coaxial with the outer shaft.

Because the high pressure swirl air is cooled by the swirl air cooling turbine provided in a radially central part intermediate between the high pressure compressor and the high pressure turbine, the energy of the swirl air is effectively expended in the swirl air cooling turbine radially central part of the region, and this prevents the generation of a stagnation zone. Thereby, the secondary air can favorably cooled before it is forwarded to the user such as the bearing boxes without causing an undue rise in the pressure of the impeller back chamber. The high pressure compressor typically consists of a centrifugal compressor.

The swirl air cooling turbine (59) may be formed without complicating the overall structure by a rotating wall member (51) attached to a hub portion of a turbine wheel of the high pressure turbine, and the seal air introduction passage may include an impeller back chamber (44) defined by a back side of an impeller wheel of the high pressure compressor and a stationary inner partition wall (42) having a rear end in a sealing engagement with the rotating wall member so as to communicate with an outer periphery of the impeller wheel. To promote the dissipation of energy from the high pressure swirl air supplied from the outer periphery of the impeller wheel, the swirl air cooling turbine may be adapted in such a manner that a high pressure swirl air obtained from an outer periphery of the impeller wheel acts upon the swirl air cooling turbine in a direction to assist a rotation of the swirl air cooling turbine.

According to a preferred embodiment of the present invention, the high pressure air introduction turbine further includes a high pressure air cooling turbine (57) formed on a front side of a disk portion of the turbine wheel of the high pressure turbine, the high pressure air cooling turbine deriving high pressure air from a high pressure air chamber (43) defined downstream of a diffuser (23) connected to an outlet end of the high pressure compressor. This ensures the supply of an adequate amount of secondary air without complicating the overall structure. In this case also, to promote the dissipation of energy from the high pressure swirl air supplied from the outer periphery of the impeller wheel, the high pressure air cooling turbine may be adapted in such a manner that the high pressure air derived from the high pressure air chamber acts upon the high pressure air cooling turbine in a direction to assist a rotation of the high pressure air cooling turbine. Preferably, the high pressure air cooling turbine comprises a part (54) of the rotating wall member opposing the front side of the disk portion of the turbine wheel of the high pressure turbine and a plurality of vanes (56) extending between the rotating wall member and the front side of the disk portion of the turbine wheel of the high pressure turbine so that the two cooling turbines may be formed without complicating the overall structure.

In particular, if the device further comprises an outer stationary partition wall (41) defining an intermediate chamber (45) in cooperation with the inner partition wall and rotating wall member, the intermediate chamber being communicated with the high pressure air chamber via a restricted passage (65), the controlled high pressure acts upon the turbine wheel of the high pressure turbine, and this counteracts the axial force which the high pressure air prevailing in the impeller back chamber so that the axial force acting upon the outer shaft can be minimized. Thereby, the bearings supporting the outer shaft are made free from excessive axial forces so that the durability of the bearings can be improved and the excessively heating of the lubricating oil can be avoided.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
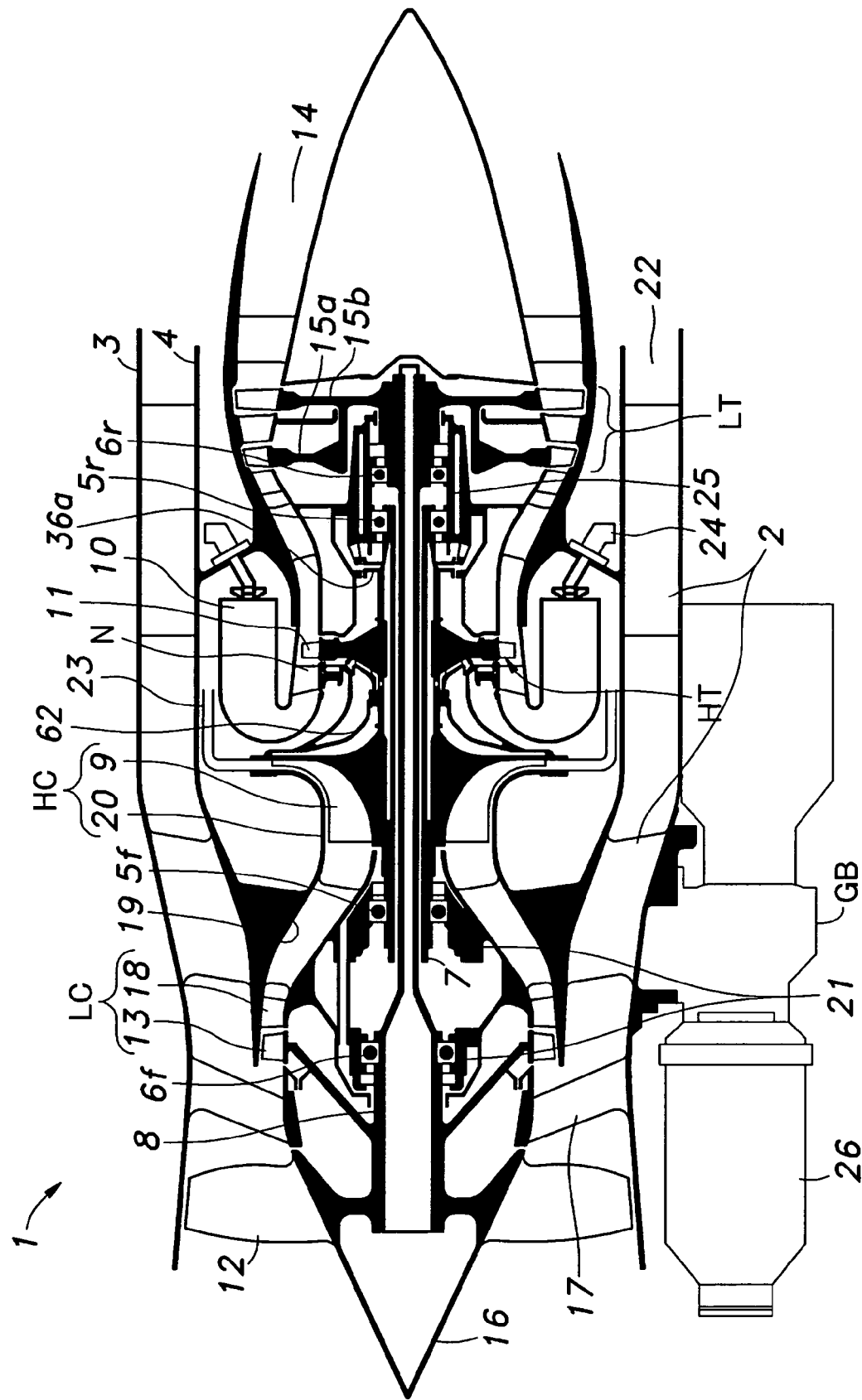
FIG. 1 is a schematic view of a jet engine embodying the present invention.

FIG. 1 is a schematic view of a multiple shaft bypass jet engine embodying the present invention. This engine 1 comprises an outer casing 3 and an inner casing 4 consisting of coaxially arranged cylindrical members joined to each other by struts 2, and an outer shaft 7 and an inner shaft 8 consisting of coaxially arranged hollow shafts centrally supported in the casings by independent bearings 5f, 5r, 6f and 6r.

The outer shaft 7 has a front end (left end in the drawing) integrally carrying an impeller wheel 9 of a high pressure centrifugal compressor HC, and a rear end (right end in the drawing) integrally carrying a high pressure turbine wheel 11 of a high pressure turbine HT provided adjacent to nozzles N of counter-flow combustion chambers 10.

The inner shaft 8 has a front end integrally carrying a front fan 12 and a compressor wheel 13 supporting rotor vanes for a low pressure axial flow compressor LC immediately behind the front fan 12, and a rear end integrally carrying a pair of turbine wheels 15a and 15b including rotor vanes placed in a combustion gas flow in a jet duct 14 so as to form a low pressure turbine LT.

A nose cone 16 is centrally provided on the front fan 12, and stator vanes 17 are provided behind the nose cone 16 with their outer ends attached to the inner circumferential surface of the outer casing 3.

Stator vanes 18 of the low pressure axial flow compressor LC are disposed on the inner circumferential surface of a front end portion of the inner casing 4. Behind the stator vanes 18 are provided an intake duct 19 for conducting the air drawn by the front fan 12 and pre-compressed by the low pressure axial flow compressor LC to the high pressure centrifugal compressor HC, and an impeller casing 20 of the high pressure centrifugal compressor HC disposed immediately downstream of the intake duct 19. The inner peripheral part of the intake duct 19 is integrally provided with a front bearing box 21 for the bearings 5f and 6f which support the front ends of the outer shaft 7 and inner shaft 8, respectively.

The air drawn by the front fan 12 is in part forwarded to the high pressure centrifugal compressor HC via the low pressure axial flow compressor LC as mentioned earlier, and the remaining larger amount of air having a relatively low velocity is expelled rearward through a bypass duct 22 defined between the outer casing 3 and inner casing 4 to provide a primary thrust in the low speed range.

To the outer periphery of the high pressure centrifugal compressor HC is connected a diffuser 23 so as to provide a high pressure air to the counter-flow combustion chambers 10 provided downstream of the diffuser 23. In each of the counter-flow combustion chambers 10 provided immediately downstream of the diffuser 23, the fuel ejected from a fuel injection nozzle 24 provided on the rear end of the combustion chamber 10 is mixed with the high pressure air supplied from the diffuser 23, and is combusted. The combustion gas which is expelled from the nozzle N of each combustion chamber 10 is ejected to the atmosphere via the jet duct 14, and provides a primary thrust in the high speed range.

The inner peripheral part of the jet duct 14 is integrally provided with a rear bearing box 25 for the bearings 5*r* and 6*r* which support the rear ends of the outer shaft 7 and inner shaft 8, respectively.

The outer shaft 7 of the engine 1 is connected to an output shaft of a starter motor 26 via a gear mechanism not shown in the drawings. As the starter motor 26 is activated, the impeller wheel 9 of the high pressure centrifugal compressor HC is driven, along with the outer shaft 7, and this causes high pressure air to be supplied to the counter-flow combustion chambers 10. When fuel mixed with this high pressure air combusts, the resulting pressure of the combustion gas drives the turbine wheel 11 of the high pressure turbine HT and the turbine wheels 15*a* and 15*b* of the low pressure turbine LT. The rotational power of the high pressure turbine wheel 11 drives the impeller wheel 9 of the high pressure centrifugal compressor HC, and the rotational power of the turbine wheels 15*a* and 15*b* of the low pressure turbine LT drives the compressor wheel 13 of the low pressure axial flow compressor LC. As the high pressure turbine wheel 9 and low pressure turbines 15*a* and 15*b* are driven by the jet pressure of the combustion gas, the engine 1 continues its rotation according to a negative feedback balance between the amount of fuel supply and the amount of intake air (at the normal operating rotational speed).

Figure 2:
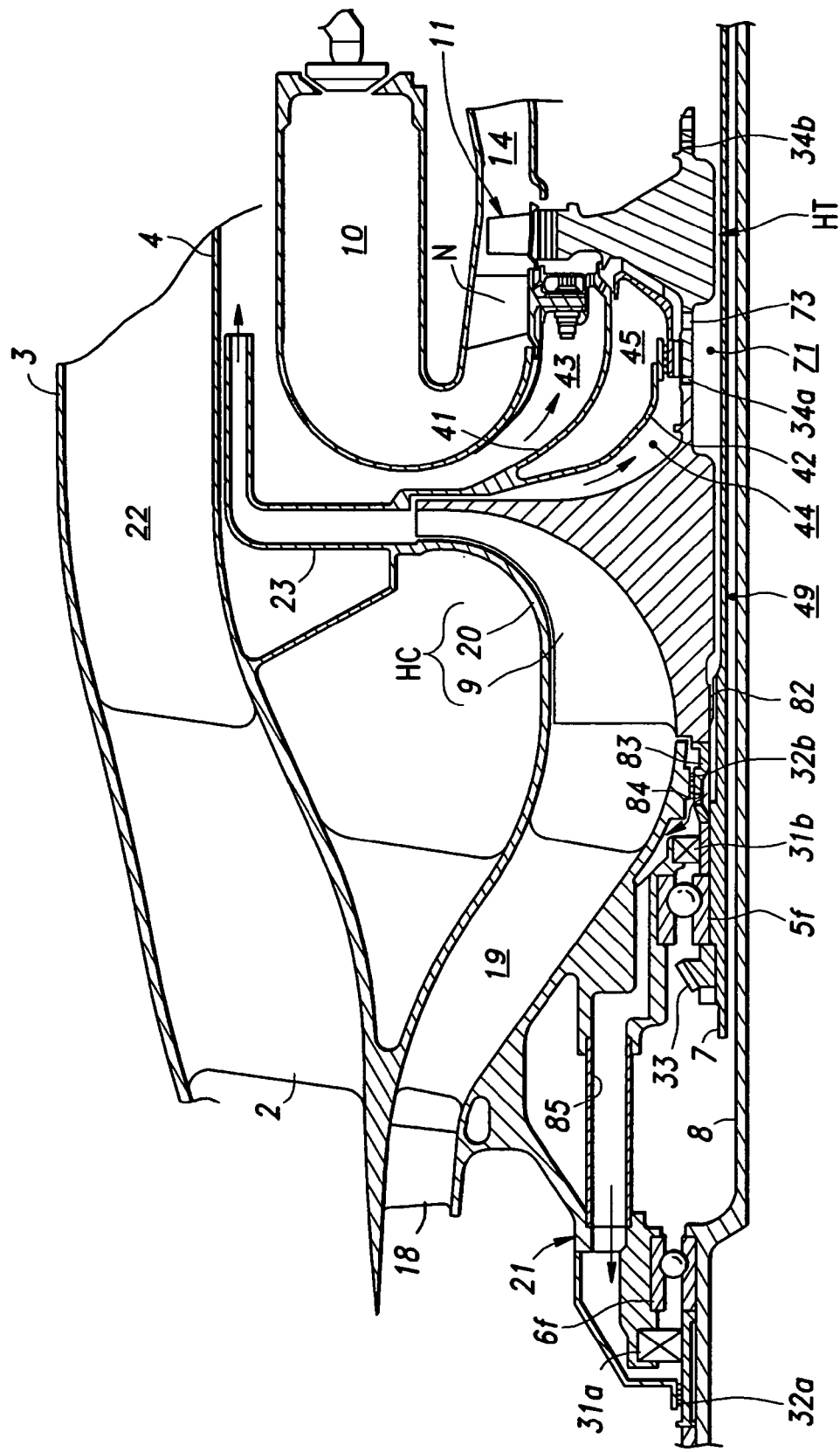
FIG. 2 is an enlarged fragmentary sectional view of the high pressure compressor and high pressure turbine of the jet engine shown in FIG. 1.
Figure 3:
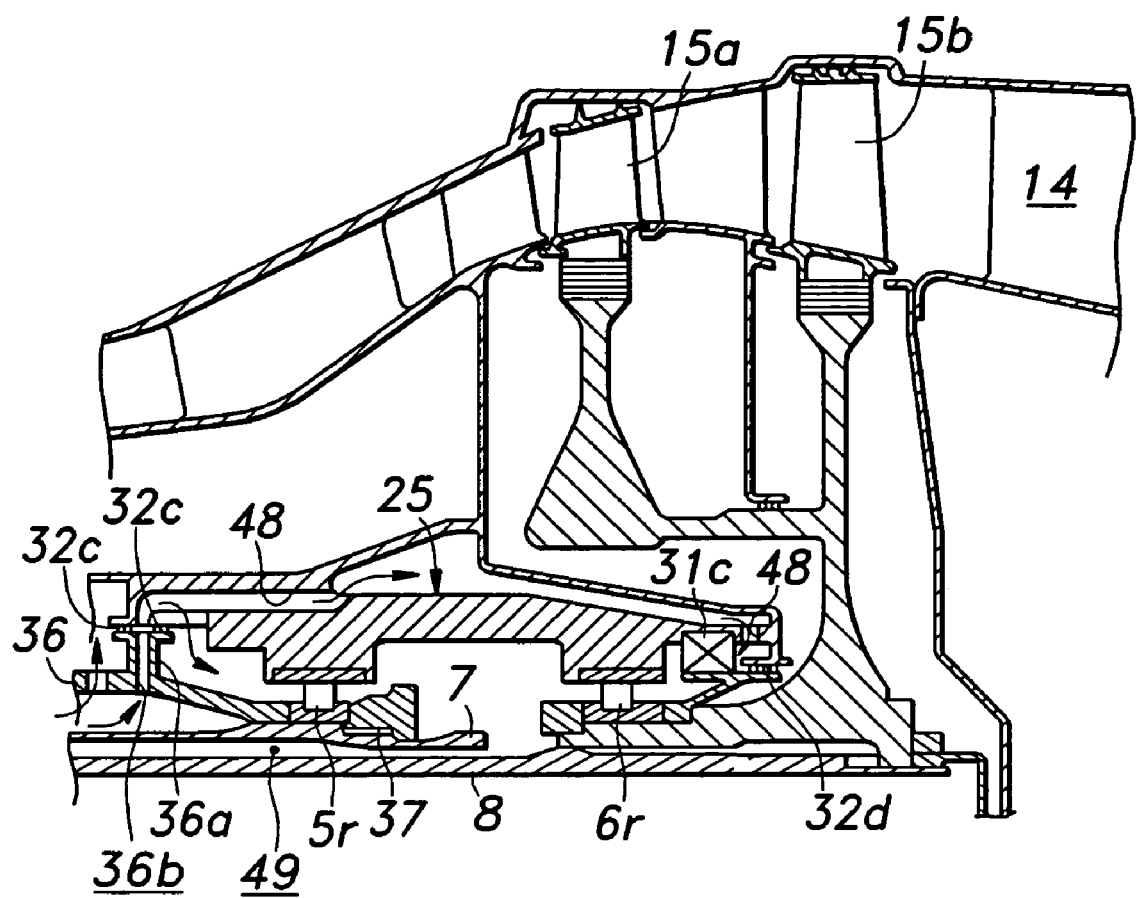
FIG. 3 is an enlarged fragmentary sectional view of the low pressure turbine of the jet engine shown in FIG. 1.

As illustrated in FIG. 2 in greater detail, support parts of the bearing 5*f* supporting the front end of the outer shaft 7 and the bearing 6*f* supporting the front end of the inner shaft 8 are provided in the front bearing box 21 at a certain distance from each other in the axial direction. As illustrated in FIG. 3 in greater detail, support parts of the bearing 5*r* supporting the rear end of the outer shaft 7 and the bearing 6*r* supporting the rear end of the inner shaft 8 are provided in the rear bearing box 25 at a certain distance from each other in the axial direction.

Floating ring seals 31*a* and 31*b* are provided ahead of the front bearing 6*f* of the inner shaft 8 and behind the front bearing 5*f* of the outer shaft 7, respectively, in the front bearing box 21, and floating ring seals 31*c* and 31*d* are provided ahead of the rear bearing 5*r* of the outer shaft 7 and behind the rear bearing 6*r* of the inner shaft 8, respectively, in the rear bearing box 25, to prevent the lubricating oil supplied to the various bearings from leaking out of the bearing boxes 21 and 25. Labyrinth seals 32*a* to 32*d* are provided between the front and rear ends of the bearing boxes 21 and 25 and the opposing outer circumferential surfaces of the inner and outer shafts 7 and 8, respectively.

The front end of the outer shaft 7 is connected to the inner race of the front bearing 5*f* and a bevel gear 33 for the starter motor, and fits into an axially front end of the impeller wheel 9 via a spline coupling. A front central hub of the turbine wheel 11 is connected to the axial center of the back side of the impeller wheel 9 via a Curvic (tradename) couplings 34*a*. The axial center of the back side of the turbine wheel 11 is connected to a collar 36 fitted on the rear end of the outer shaft 7 adjacent to a bearing portion via a Curvic coupling 34*b*.

The impeller wheel 9, turbine wheel 11, collar 36 and inner race of the bearing 5*r* on the rear end of the out shaft 7 are fitted onto the outer shaft 7, in this order, and a bearing nut 37 threaded onto the outer shaft 7 applies a prescribed initial tension to the outer shaft 7.

Figure 4:
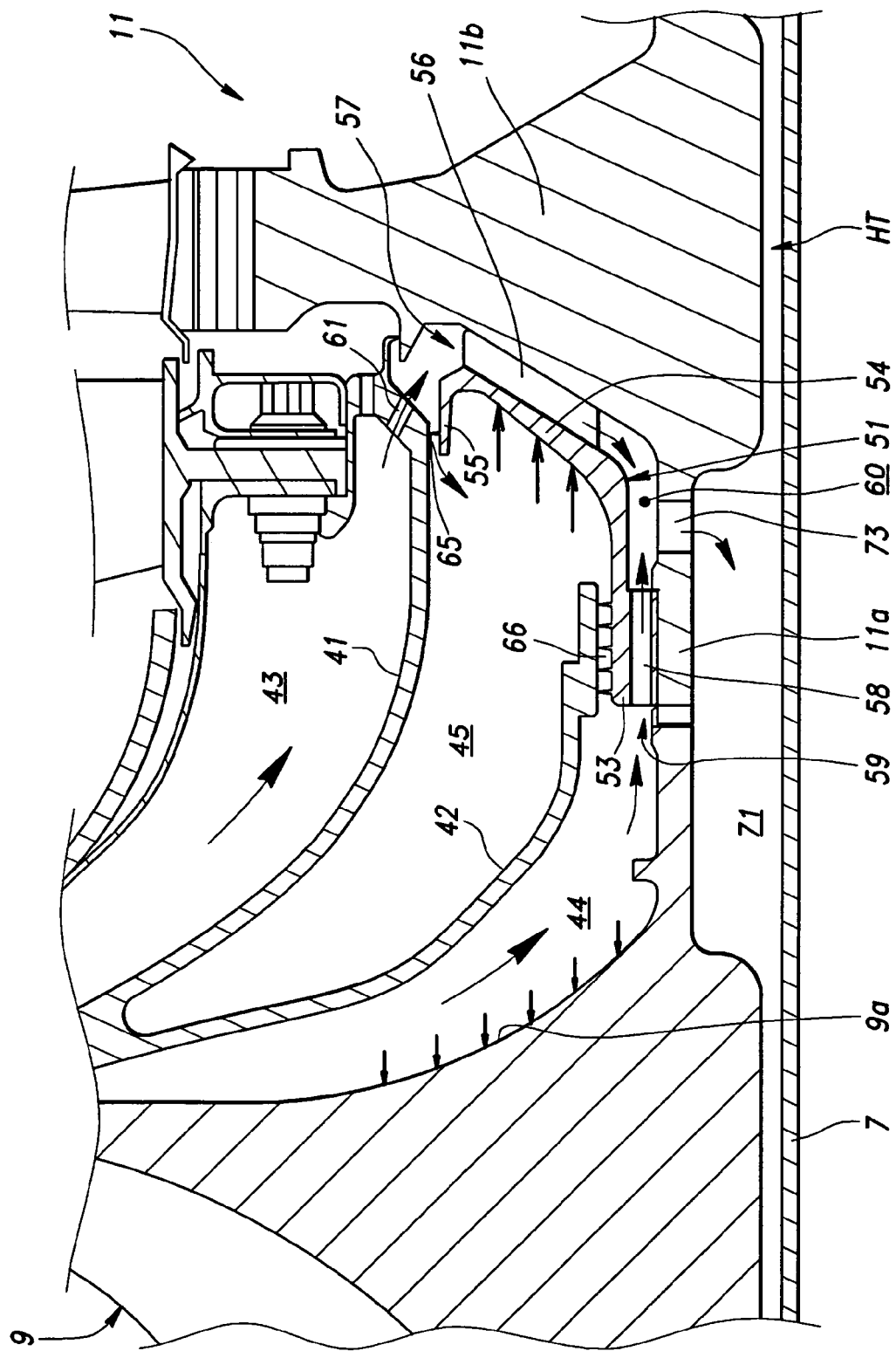
FIG. 4 is an enlarged fragmentary view of an arrangement for introducing seal air in the jet engine shown in FIG. 1.
Figure 5:
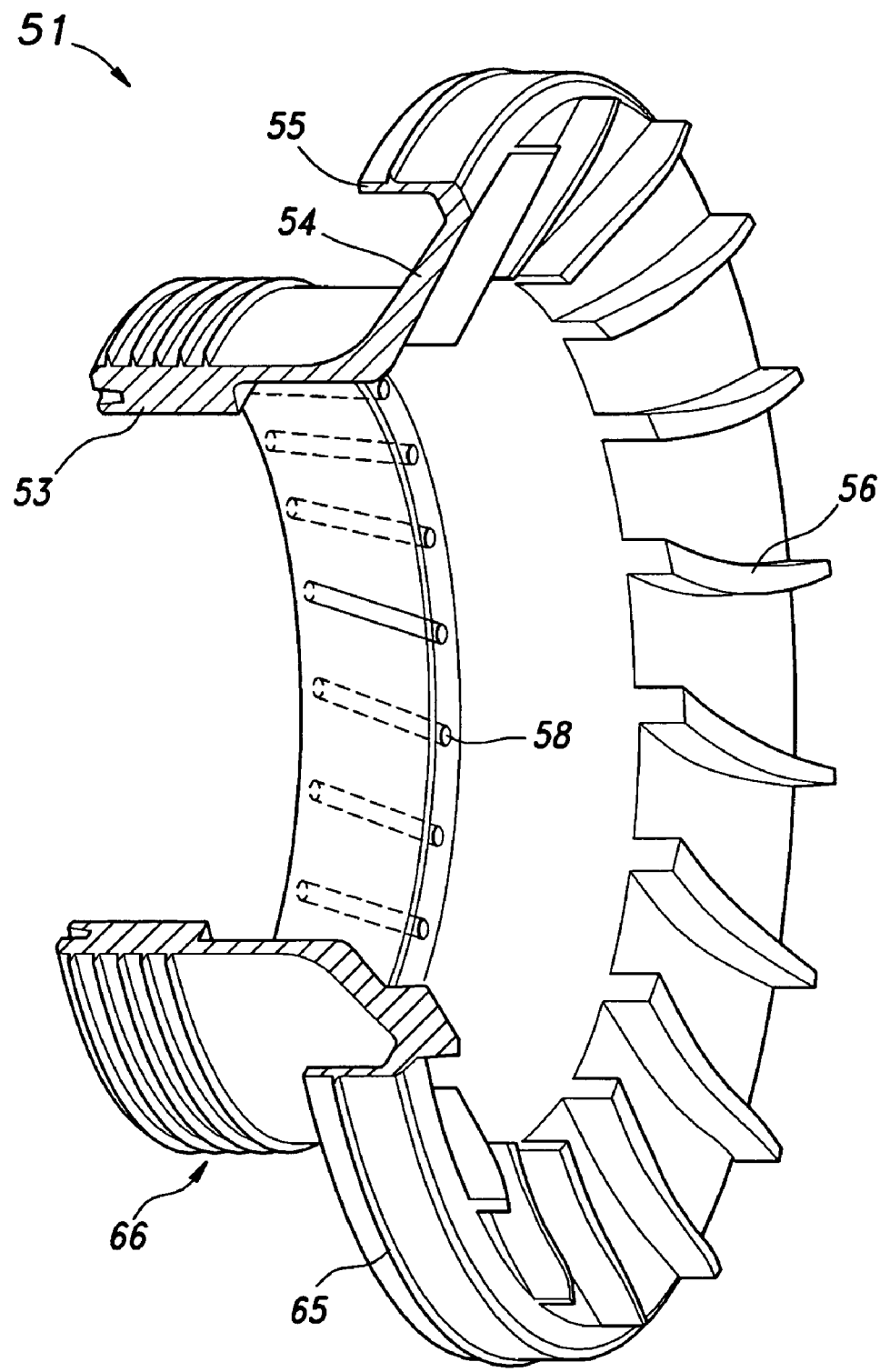
FIG. 5 is a partly broken away perspective view of the rotating wall member of rthe jet engine shown in FIG. 1.

As shown in FIG. 4 in greater detail, behind the backside of the impeller wheel 9 are provided an outer partition wall 41 and an inner partition wall 42 as extensions of the impeller casing 20. The outer partition wall 41 extends to a part adjacent to the disk portion 11*b* of the turbine wheel 11, and defines a high pressure air chamber 43 that accommodates the combustion chambers 10 therein. The inner partition wall 42 extends to a part adjacent to the front end 11*a* of the central hub portion of the turbine wheel 11, and defines an impeller back chamber 44 jointly with the backside 9*a* of the impeller wheel 9. The inner partition wall 42 also defines an intermediate chamber 45 jointly with the outer partition wall 41. During the operation of the engine 1, the high pressure air produced by the impeller wheel 9 of the high pressure centrifugal compressor HC flows into the high pressure air chamber 43, and the high pressure spiral or swirl air flow produced in the backside of the impeller wheel 9 flows into the impeller back chamber 44.

A rotating wall member 51 is press fitted on the front end 11*a* of the central hub portion of the turbine wheel 11. The rotating wall member 51 comprises an inner cylindrical portion 53 which is fitted on the front end 11*a* of the central hub portion of the turbine wheel 11, a conical portion 54 extending radially outwardly from the rear end of the inner cylindrical portion 53, an outer cylindrical portion 55 extending forwardly from the outer periphery of the conical portion 54 and a plurality of vanes 56 projecting from the rear surface of the conical portion 54 at a regular circumferential interval.

In the illustrated embodiment, the rear surface of the conical portion 54 of the rotating wall member 51 opposes the front surface of the disk portion 11*b* defining a prescribed gap between them, and the rear end of each vane 56 engages the front surface of the disk portion 11*b* so that a high pressure air cooling turbine 57 is formed on the front surface of the disk portion 11*b* of the turbine wheel 11. The inner cylindrical portion 53 is formed with a plurality of deflecting flow passages 58 extending obliquely from the front end surface to the rear end surface of the inner cylindrical portion 53, and these deflecting flow passages 58 form a swirl air cooling turbine 59. The outlet ends of the high pressure air cooling turbine 57 and swirl air cooling turbine 59 open out to a gap 60 formed on the inner periphery of the inner cylindrical portion 53 of the rotating wall member 51. The rear end of the outer partition wall 41 is formed with introduction holes 61 for introducing the high pressure air from the high pressure air chamber 43 while imparting a spiral component to this air flow.

A seal fin 65 projects from the outer peripheral surface of the outer cylindrical portion 55 of the rotating wall member 51, and a labyrinth seal 66 projects from the outer peripheral surface of the inner cylindrical portion 53. The tip of the seal fin 65 projecting from the outer cylindrical portion 55 opposes the inner circumferential wall of the rear end of the outer partition wall 41 defining a prescribed gap therebetween, and the labyrinth seal 66 of the inner cylindrical portion 53 opposes the inner circumferential surface of the rear end of the inner partition wall 42 defining a prescribed gap therebetween.

An air passage (seal air supply passage) 71 is defined between the inner circumferential surface of the impeller wheel 9 and turbine wheel 11 and the opposing outer circumferential surface of the outer shaft 7, and a communication hole 73 is formed in the front end 11a of the hub portion of the turbine wheel 11 to communicate the afore-mentioned gap 60 with the air passage 71.

As shown in FIG. 2, the spline portion of the impeller wheel 9 is formed with an axial groove 82. A collar 83 provided with the labyrinth seal 32b is disposed on the front end of the front hub portion of the impeller wheel 9, and is formed with an orifice 84 to communicate the air passage 71 (interior of the hollow front end 11a of the hub portion of the turbine wheel 11 which extends to the rear end of the impeller wheel 9) with the interior of the rear part of the front bearing box 21.

The front bearing box 21 is internally formed with a plurality of passages 85 at circumferential regular positions to communicate the front and rear parts of the bearing box 21 with each other. The cross sectional area of the passages 85 is substantially greater than that of the orifice 84.

In this gas turbine engine, the high pressure air compressed by the high pressure centrifugal compressor HC in most part flows into the high pressure air chamber 43 accommodating the counter-flow combustion chambers 10, via the diffuser 23, and the remaining part of the high pressure air flows into the impeller back chamber 44 from the outer periphery of the impeller wheel 9. The high pressure air that has flowed into the high pressure air chamber 43 is used for burning fuel in the counter-flow combustion chambers 10, and the pressure of the resulting combustion gas drives the high pressure turbine wheel 11 of the high pressure turbine HT and the lower pressure turbine wheel 15 of the low pressure turbine LT.

As shown in FIG. 4, a part of the high temperature, high pressure air that has flowed into the high pressure air chamber 43 is ejected from the introduction hole 61 extending in an oblique direction (including a tangential or circumferential component), and flows into the high pressure air cooling turbine 57. The high pressure air is deflected by the vanes 56 in the high pressure air cooling turbine 57, and acts thereon in the direction to assist the rotation of the high pressure air cooling turbine 57 (or the outer shaft 7). Thereby, the high pressure air expends a part of the energy thereof and this causes the temperature of the high pressure air to drop. The relatively cooled air then flows into the gap 60 as a seal air.

Meanwhile, the high temperature, high pressure swirl air that has flowed into the impeller back chamber 44 flows from a radially outer part (inlet end) to a radially inner part of the impeller back chamber 44, and flows into the swirl air cooling turbine 59 from the rear end of the impeller back chamber 44. The high pressure swirl air is deflected by the wall surface of the deflecting passages 58, and acts upon the swirl air cooling turbine 59 in a direction to assist the rotation of the swirl air cooling turbine 59. Thereby, the high pressure swirl air also expends a part of the energy thereof and this causes the temperature of the high pressure swirl air to drop. The relatively cooled air then flows into the gap 60 as a seal air.

The seal air that has flowed into the gap 60 from the high pressure air cooling turbine 57 and the swirl air cooling turbine 59 flows into an air passage 71 via the communication hole 73, and then flows into a part where a floating ring seal 31b is mounted behind the front bearing 5f that supports the front end of the outer shaft 7 in the front bearing box 21 via the axial groove 82 and orifice 84. The seal air also flows into a part where a floating ring seal 31a is mounted in front of the front bearing 6f that supports the front end of the inner shaft 8 in the front bearing box 21 via the passage 85 that communicates the front and rear parts of the front bearing box 21 with each other.

In this manner, the high pressure air that has flowed into the parts where the floating ring seals 31a and 31b are mounted ahead of and behind the front bearing box 21, respectively, keeps the outer pressure of the bearing box 21 higher than the inner pressure thereof so that the leakage of lubricating oil from the interior of the front bearing box 21 can be avoided. This seal pressure is kept sealed by the labyrinth seals 32a and 32b.

In the foregoing embodiment, owing to the use of the high pressure air cooling turbine 57 and swirl air cooling turbine 59, the temperatures of the high pressure air and high pressure swirl air produced by the high pressure centrifugal compressor HC is reduced in temperature and forwarded to the bearing box 21 as a seal air. This effectively prevents a rise in the temperature of the lubricating oil of the bearing box 21 so that an excessive temperature rise in the aluminum case and steel gears as well as premature degradation of the lubricating oil can be avoided. Therefore, the need of a large oil cooler or a large volume of lubricating oil can be avoided, and this contribute to the reduction in the weight of the gas turbine engine, and the reduction in the cost.

The path of the seal air that is supplied to the front bearing box 21 was described above, and a similar arrangement is also made for the rear bearing box 25. In the case of the rear bearing box 25, as shown in FIG. 3, the part of the collar 36 which is located ahead of the rear bearing 5r supporting the rear end of the outer shaft 7 is integrally formed with a radially outward flange portion 36a having a T-shaped cross section, and an air passage 36b is formed in this flange portion 36a. Two collar portions 32 extend axially from the outer periphery of the flange portion 36a in either axial direction, and are each provided with a labyrinth seal 32c that cooperates with the opposing surface of the rear bearing box 25. By opening out the air passage 36b between these two labyrinth seals 32c, the gap defined between the inner circumferential surface of the collar 36 and the outer circumferential surface of the outer shaft 7 communicates with the part interposed between the two labyrinth seals 32c. The rear bearing box 25 is provided with a passage 48 which communicates the part interposed between the two labyrinth seals 32c with a part interposed between a floating ring seal 31c provided behind the rear bearing 6r supporting the rear end of the inner shaft 8 and the adjacent labyrinth seal 32d.

The interior of the front bearing box 21 communicates with the interior of the rear bearing box 25 via the gap 49 defined between the inner circumferential surface of the outer shaft 7 and the outer circumferential surface of the inner shaft 8 so that a part of the lubricating oil that has lubricated the bearings 5r and 6r of the rear bearing box 25 and the seal air that has passed through the labyrinth seal 32c and floating ring seal 31c flow into the front bearing box 21 via the gap 49, and is conducted to a gearbox (GB) connected to the starter motor 26 via a drain hole (not shown in the drawing) formed along the length of the shaft of the starter motor bevel gear that meshes with the bevel gear 33 secured to an axial end of the outer shaft 7. The mixture of the lubricating oil and seal air that has reached the gearbox of the starter motor 26 is separated into oil and air by an oil separator (not shown in the drawing) provided in the gear box and the separated air is expelled to the atmosphere via a bypass duct 22 while the separated oil is recycled.

As indicated by the arrows in FIG. 4, the impeller wheel 9 is urged forward by the pressure of the high pressure swirl air in the impeller back chamber 44. However, in the illustrated embodiment, the high pressure swirl air flows out from the swirl air cooling turbine 59 which is located in the innermost part of the impeller back chamber 44 so that a pressure drop owing to the inward swirl air flow occurs over the entire impeller back chamber 44 as opposed to the conventional arrangement. Therefore, the average pressure in the impeller back chamber 44 is relatively low, and the forward biasing force (axial load) acting upon the impeller wheel (or the outer shaft 7) is kept lower than otherwise.

In the illustrated embodiment, the high pressure air in the high pressure air chamber 43 is also introduced into the intermediate chamber 45, and this produces a rearward biasing force (axial load) that acts upon the outer shaft 7 as indicated by the arrows in FIG. 4. The introduction of the high pressure air from the high pressure air chamber 43 to the intermediate chamber 45 takes place via the gap defined between the outer partition wall 41 and the outer cylindrical portion of the rotating wall member 51. A seal fin 65 may be provided between the outer partition wall 41 and the outer cylindrical portion of the rotating wall member 51 so as to adjust the pressure that is produced in the intermediate chamber 45. The air tightness of the intermediate chamber 45 can be accomplished by providing a multi-layered labyrinth seal 66 having a smaller diameter than the aforementioned seal fin 65 between the inner partition wall 41 and the rotating wall member 51. Thereby, the high pressure air introduced into the intermediate chamber 45 applies a rearward biasing force to the rotating wall member 51 (or the outer shaft 7).

Thus, in the illustrated embodiment, the outer shaft 7 is subjected to a forward axial force via the impeller wheel 9 and a rearward axial force via the rotating wall member 51 so that the two opposing axial forces substantially cancel each other and the overall axial force is reduced to a small value. Therefore, the axial loads acting on the bearings 5f and 5r supporting the outer shaft 7 are minimized, and problems such as degradation of the lubricating oil due to the exposure to a high temperature and premature failure of the bearings which the conventional arrangement suffered from can be avoided. Also, the magnitude of the axial force (bearing thrust) given as the sum of the forward and rearward axial forces that act upon the impeller wheel 9 and rotating wall member 51, respectively, can be adjusted by appropriately controlling the amount of the high pressure air that is introduced into the intermediate chamber 45 from the high pressure air chamber 43 by using the seal fin and selecting the cross sectional area of the deflecting passages 58 of the swirl air cooling turbine 59.

Although the present invention has been described in terms of a preferred embodiment thereof, it is obvious to a person skilled in the art that various alterations and modifications are possible without departing from the scope of the present invention which is set forth in the appended claims. For instance, the vanes that form the high pressure air cooling turbine were formed on the side of the rotating wall member, but may also be formed on the side of the turbine wheel. It is also possible to do away with the rotating wall member, and form the high pressure air cooling turbine integrally to the front side of the turbine wheel. The swirl air cooling turbine was formed on the inner cylindrical portion of the rotating wall member in the foregoing embodiment, but may also be formed on the impeller wheel or a specially provided ring or the like. The deflection passage of the swirl air cooling turbine is not limited to the axial through hole but may also consist of an oblique passage slanted in the rotational direction in any desired manner or vane type deflection passage fitted with vanes and/or guide plates. In the illustrated embodiment, the high pressure air was introduced into the intermediate chamber defined between the high pressure air chamber and impeller back chamber so that the pressure in the intermediate chamber applies a rearward axial force to the front surface of the high pressure air cooling turbine, and this axial force can be adjusted as required. Also, as can be readily appreciated by a person skilled in the art, the specific structures of the gas turbine engine and seal air introduction means can be modified at will without departing from the spirit of the present invention.

The invention claimed is:

1. A device for supplying secondary air in a gas turbine engine, comprising:
   an inner shaft connected to a low pressure compressor and a low pressure turbine;
   an outer shaft coaxially disposed with respect to the inner shaft, connected to a high pressure compressor and a high pressure turbine;
   at least a pair of bearing boxes which are spaced from each other in an axial direction each accommodating a bearing for supporting an end of the inner or outer shaft;
   a seal air introduction passage for introducing a part of high pressure air drawn from the high pressure compressor into a seal section provided in each of the bearing boxes; and
   a high pressure air introduction turbine provided in the seal air introduction passage and attached to a part attached to the outer shaft in a rotationally fast manner, the high pressure air introduction turbine including a swirl air cooling turbine formed around a section of the outer shaft intermediate between the high pressure compressor and the high pressure turbine, and including a spiral flow path extending in a substantially cylindrical plane coaxial with the outer shaft.

2. A device for supplying secondary air in a gas turbine engine according to claim 1, wherein the swirl air cooling turbine is formed by a rotating wall member attached to a hub portion of a turbine wheel of the high pressure turbine, and the seal air introduction passage includes an impeller back chamber defined by a back side of an impeller wheel of the high pressure compressor and a stationary inner partition wall having a rear end in a sealing engagement with the rotating wall member so as to communicate with an outer periphery of the impeller wheel.

3. A device for supplying secondary air in a gas turbine engine according to claim 2, wherein the swirl air cooling turbine is adapted in such a manner that a high pressure swirl air obtained from an outer periphery of the impeller wheel acts upon the swirl air cooling turbine in a direction to assist a rotation of the swirl air cooling turbine.

4. A device for supplying secondary air in a gas turbine engine according to claim 1, wherein the high pressure air introduction turbine further includes a high pressure air cooling turbine formed on a front side of a disk portion of the turbine wheel of the high pressure turbine, the high pressure air cooling turbine deriving high pressure air from a high pressure air chamber defined downstream of a diffuser connected to an outlet end of the high pressure compressor.

5. A device for supplying secondary air in a gas turbine engine according to claim 4, wherein the high pressure air cooling turbine is adapted in such a manner that the high pressure air derived from the high pressure air chamber acts upon the high pressure air cooling turbine in a direction to assist a rotation of the high pressure air cooling turbine.

6. A device for supplying secondary air in a gas turbine engine according to claim 4, wherein the high pressure air cooling turbine comprises a part of the rotating wall member opposing the front side of the disk portion of the turbine wheel of the high pressure turbine and a plurality of vanes extending between the rotating wall member and the front side of the disk portion of the turbine wheel of the high pressure turbine.

7. A device for supplying secondary air in a gas turbine engine according to claim 2, wherein the high pressure air introduction turbine further includes a high pressure air cooling turbine formed on a front side of a disk portion of the turbine wheel of the high pressure turbine, the high pressure air cooling turbine deriving high pressure air from a high pressure air chamber defined downstream of a diffuser connected to an outlet end of the high pressure compressor, and being defined by a conical portion of the rotating wall member opposing the front side of the disk portion of the turbine wheel of the high pressure turbine while the high pressure swirl air cooling turbine is defined by an inner cylindrical portion of the rotating wall member.

8. A device for supplying secondary air in a gas turbine engine according to claim 1, wherein the seal air introduction passage includes an impeller back chamber defined by a back side of an impeller wheel of the high pressure compressor and a stationary inner partition wall having a rear end in a sealing engagement with the rotating wall member so as to communicate with an outer periphery of the impeller wheel.

9. A device for supplying secondary air in a gas turbine engine according to claim 8, further comprising an outer stationary partition wall defining an intermediate chamber in cooperation with the inner partition wall and rotating wall member, the intermediate chamber being communicated with the high pressure air chamber via a restricted passage.

10. A device for supplying secondary air in a gas turbine engine according to claim 1, wherein the high pressure compressor comprises a centrifugal compressor wheel.

* * * * *